(12) United States Patent
Copertino et al.

(10) Patent No.: US 10,225,617 B2
(45) Date of Patent: Mar. 5, 2019

(54) METHODS AND APPARATUS FOR PRESENTING SOCIAL NETWORK CONTENT IN CONJUNCTION WITH VIDEO CONTENT

(75) Inventors: Steven Copertino, Westwood, NJ (US); Brent William Brooks, Brooklyn, NY (US); Corinne Kerns Lowry, New York, NY (US); Joshua Charles Goldstein, New York, NY (US); Noah Mittman, Brooklyn, NY (US); Rosalie Ehrlich, Jackson Heights, NY (US); Russell R. Alderson, Brooklyn, NY (US); Sanjay Cherubala, Brooklyn, NY (US); Sean MacDonald, Woodstock, NY (US); Virginia Welford Miracle, Austin, TX (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 67 days.

(21) Appl. No.: 13/165,947

(22) Filed: Jun. 22, 2011

(65) Prior Publication Data
US 2012/0331496 A1    Dec. 27, 2012

(51) Int. Cl.
*H04N 21/41* (2011.01)
*H04N 21/4788* (2011.01)
(Continued)

(52) U.S. Cl.
CPC ..... *H04N 21/4788* (2013.01); *H04L 65/4015* (2013.01); *H04N 21/25866* (2013.01);
(Continued)

(58) Field of Classification Search
CPC .......... H04L 65/4015; H04N 21/25866; H04N 21/4122; H04N 21/4788; H04W 4/206; H04W 4/21
(Continued)

(56) References Cited

U.S. PATENT DOCUMENTS

| 6,952,221 | B1 * | 10/2005 | Holtz | G11B 27/034 |
| | | | | 715/719 |
| 2003/0182663 | A1 * | 9/2003 | Gudorf et al. | 725/110 |

(Continued)

*Primary Examiner* — Pankaj Kumar
*Assistant Examiner* — Alazar Tilahun
(74) *Attorney, Agent, or Firm* — Straub & Straub; Michael P. Straub; Stephen T. Straub

(57) ABSTRACT

Methods and apparatus for generating, distributing, and/or presenting social networking content in conjunction with video content are described. In accordance with various embodiments, social networking related information, e.g., comments, remarks and/or a twitter feed, are displayed in conjunction with the display of video to which the social networking information relates. The social networking related information may be displayed on the same or a different device from that which is used to display the video comments. In some embodiments, the social networking information, e.g., comments on a program, event or broadcast, are displayed on a personal computer or other device such as a mobile telephone, while video content is being viewed, e.g., on a television which is provided video content via a set top box. A knowledgeable moderator can review, supplement, add and delete comments in real time enhancing the overall social networking session.

20 Claims, 6 Drawing Sheets

(51) Int. Cl.
  *H04N 21/258*   (2011.01)
  *H04L 29/06*    (2006.01)
  *H04W 4/21*     (2018.01)
  *H04W 4/20*     (2018.01)
(52) U.S. Cl.
  CPC ........ *H04N 21/4122* (2013.01); *H04W 4/206* (2013.01); *H04W 4/21* (2018.02)
(58) Field of Classification Search
  USPC ...................................... 725/51, 60, 61, 109
  See application file for complete search history.

(56)            References Cited

U.S. PATENT DOCUMENTS

2007/0288978 A1* 12/2007 Pizzurro et al. .............. 725/112
2012/0042334 A1*  2/2012 Choi et al. ..................... 725/32
2012/0174157 A1*  7/2012 Stinson et al. ................. 725/40

\* cited by examiner

METHODS AND APPARATUS FOR PRESENTING SOCIAL NETWORK CONTENT IN CONJUNCTION WITH VIDEO CONTENT

FIELD OF THE INVENTION

Various embodiments are related to cable network systems, and more particularly, to method and apparatus for presenting social networking content in conjunction with displaying video content.

BACKGROUND OF THE INVENTION

Social networks such as Twitter allow users to share comments and provide information and insights resulting in a social or communicable experience.

Watching of video content, e.g., TV programs, broadcasts of sporting events, news shows, etc. often serve as a basis for comments and remarks communicated via various social networking networks.

Unfortunately, the exchange of comments via social networks often occurs in a manner that is not synchronized, among a plurality of social network users, with the display of content. Furthermore, comments on many networks are simply received and distributed with little or no input or oversight, e.g., by a individual knowledgeable about the content being displayed.

In addition to the problem of lack of oversight on many social networks, comments which are generated and distributed at one point in time are normally simply logged and while such comments might be accessible, they are normally not available in a manner that is synchronized to the display of content to which the comments relate.

For example, while a user may be able to access a log of comments about a TV program, the user viewing a recorded program lacks of sense of synchronization of how the comments in the log were generated as the program was originally displayed, e.g., in real time or as part of a scheduled broadcast.

In view of the above discussion, it should be appreciated that there is a need for improving the way in which social network content, e.g., Twitter and/or other comments or discussion, related to video content which may be viewed in real time while an event is ongoing or subsequently from a recording, are created, distributed and accessed. In particular, it would be desirable if at least some embodiments supported playback of recorded content in a manner that allows comments to be supplied in a synchronized manner reflecting the sequence and timing of the comments as they were generated relative to the video content being displayed at the time of the original comment generation. In addition, it would be desirable if at least some moderation and/or human control of comments were supported to improve the overall quality and nature of the comments which are being distributed and/or to remove comments which are off topic or offensive.

SUMMARY OF THE INVENTION

Methods and apparatus for generating, distributing, and/or presenting social networking content in conjunction with video content are described. In accordance with various embodiments, social networking related information, e.g., comments, remarks and/or a twitter feed, are displayed in conjunction with the display of video to which the social networking information relates. The social networking related information may be displayed on the same or a different device from that which is used to display the video content. In some embodiments, the social networking information, e.g., comments on a program, event or broadcast, are displayed on a personal computer or other device such as a mobile telephone, while video content is being viewed, e.g., on a television which is provided video content via a set top box.

In some embodiments, a social networking content sever is used to receive and distribute comments. The comments can be received from a wide range of devices, e.g., while a broadcast or program is ongoing. The comments can be distributed in real time or near real time, e.g., while the sporting event or program is still on going. In some embodiments, a moderator is provided to host and/or oversee a social networking session corresponding to the video content, e.g., TV program, sporting event, etc. being displayed. The moderator can review comments prior to distribution, add comments, delete comments and/or provide meaningful insights relating to the topic being discussed.

In some embodiments the moderator is an individual educated or knowledgeable in the field, e.g., sporting event, technical subject, etc. to which the video content relates. The moderator can, and in some embodiments is, hired prior to a program presentation to act as the moderator. The time window for submitting or adding comments may be closed at a point in time, e.g., within an hour of the end of the program. In some embodiments, the time the comment submission period closes corresponds to the time the moderator is available to oversee the comments. In other embodiments a distinction is made between moderated comments and subsequently submitted comments with a user watching a recorded version of the program being able to receive and/or display the moderated and/or unmoderated comments in a manner synchronized to the display of particular program, e.g., video content, to which the comments relate.

In some embodiments social network information is supplied to a personal computer, e.g., during display of video content, after a user logs in to a server and indicates the program and/or video content being viewed. Identification of the user and the program being viewed may be supplied to a social network content server as part of a login process, e.g., a manual login process initiated by the user.

In other embodiments, presentation of social network information may be initiated in an automated or semi-automated manner via a user's set top box through which the content is being supplied. In at least some such embodiments, the video content is supplied with information, e.g., metadata, providing social network information. The social network information may indicate whether social network information is available for content, the times social network information is available and/or the times comments can be submitted, and/or information identifying the social networking content server to be contacted should a user of the STB seek to participate in a social networking session or receive social network information, e.g., comments, corresponding to video content which the STB supplies, e.g., to a TV for display.

In some embodiments, upon a STB receiving a signal indicating that video content for which social networking information is available or a social networking session is ongoing is being viewed, the user is prompted to indicate whether they would like to participate in the social networking session, e.g., receive and send comments (if it is ongoing) and/or receive social networking information (e.g, receive comments if the session has been closed).

The STB responds to the user input indicating that social information is sought by sending a signal to the network headend. The signal identifies the STB, user, and/or content being viewed. In some embodiments the STB supports digital video recorder functionality and the content being viewed may be stored content. The headend receiving a signal indicating a desire for social information relating to video content determines the social networking information server to be contacted for the social network information. This may be done based on information in a signal received from a STB identifying the social networking content server corresponding to video content being viewed and/or based on information stored by the headend associating content being supplied to a STB, e.g., as part of a VOD session, and the social networking content server associated with the content being supplied.

The headend may include a customer database including a STB or IP address to which the content server is to supply content. The headend looks this information up and sends the address of the device to which social network information is to be provided along with information identifying the content to which the social network information relates, e.g., a program identifier and/or other identifier of the video content being viewed.

The social networking content server then supplies available content to the device to which the social network information is to be supplied. The device may be, e.g., a PC, as set top box, or cell phone. Comments may be received from the device to which the social network information, e.g, real time or near real time comments, are received. Received comments are integrated with comments form other users and/or the moderator and distributed by the social network server.

When comments are sent to, from, or by way of a device which is being used to display and/or output the video content being viewed, the device can be responsible for integrating the comments/information from the social network with the video content being displayed. For example, in some embodiments a computer or STB mergers the social network information/comments with the video content so that the social network comments/information appear on the same screen, e.g., in a box or window portion, which is used to display the video content.

In at least some automated deployments, a STB provides information on the tuning to a program and the user may signal via the STB an interest in participating in an enhanced social network experience. In such a case the twitter and/or other comment information may, and in some embodiments is, automatically streamed to a device, e.g., PC coupled to the high speed data network based on information received via the STB.

In a time shifted version, the video content may be, and in some embodiments is, stored on the user's DVR, which may be part of a STB, but a signal is sent via the DVR to the headend to initiate the supply of the twitter/comment feed that was recorded, e.g., on the social content server, for the event. The feed may be sent to the PC corresponding to the subscriber and/or another device such as the DVR. Network based DVR embodiments are also possible in which a network based DVR system operates in the same or similar manner as the STB based DVR in initiating retrieval and distribution of social network information relating to a recorded program being supplied to a user's STB or other device for display.

Numerous additional features, embodiments and benefits are described in the detailed description which follows.

DETAILED DESCRIPTION

Figure 1:
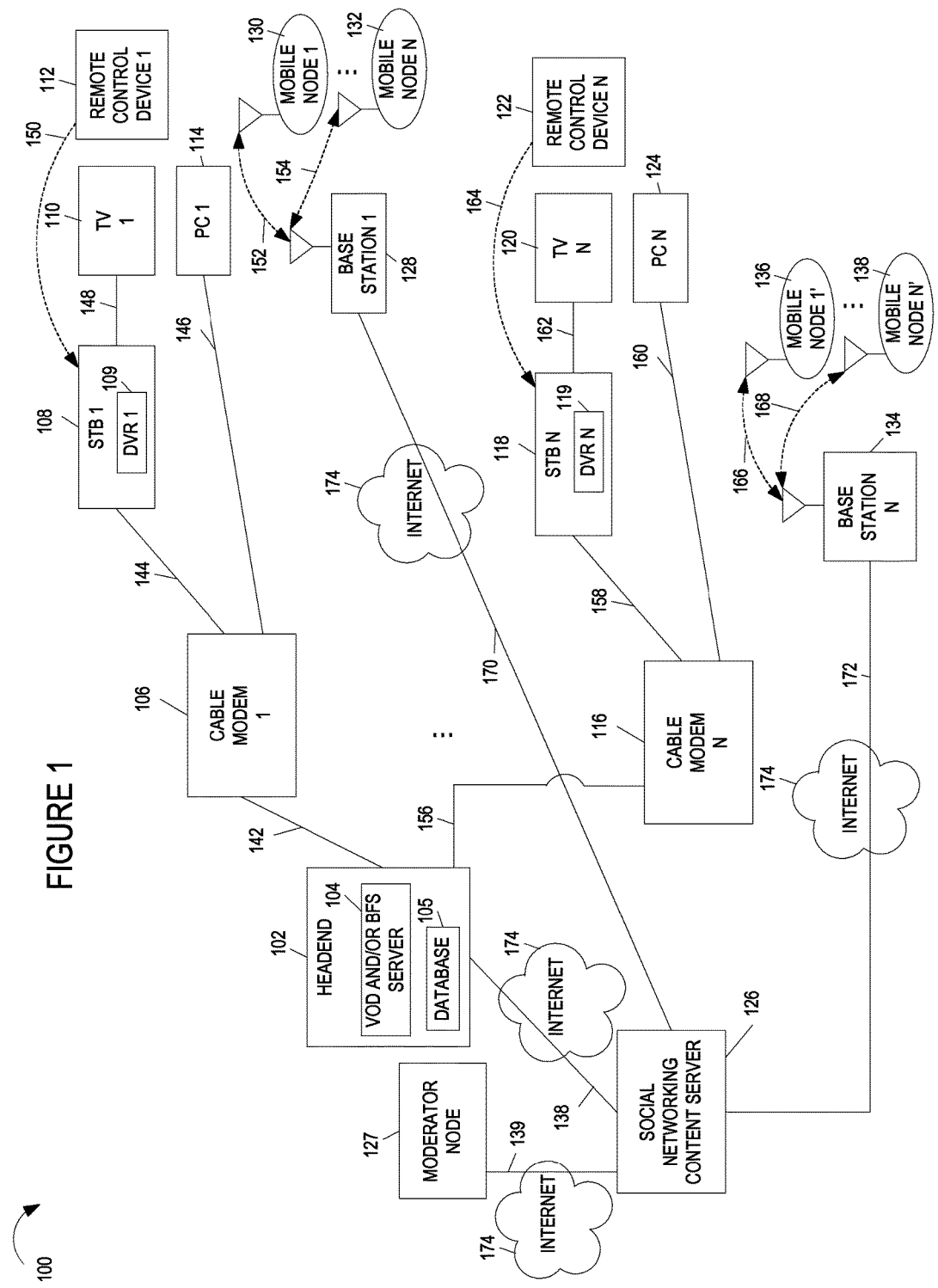
FIG. 1 is a drawing of an exemplary system 100 for presenting social networking content in conjunction with video content.

FIG. 1 is a drawing of an exemplary system 100 for presenting social networking content in conjunction with video content. Exemplary system 100 includes a headend 102, coupled to a plurality of cable modems (cable modem 106, . . . , cable modem N 116) via links (154, 156), respectively. Headend 102 includes a video on demand (VOD) server and/or broadcast file server (BFS) 104 and a database 105. System 100 also includes a social networking content server 126 and a moderator node 127. Headend 102 is coupled to social networking content server 126 via communications link 138 including communications through Internet 174. Social networking content server 126 is coupled to moderator node 127 via communications link 139 including communications through Internet 174. In some embodiments, there is a plurality of moderator nodes corresponding to social networking content server 126. In some such embodiments, there is a plurality of alternative moderator nodes corresponding to the same video content program. In some embodiments, there is a plurality of different social networking content servers.

Exemplary system 100 further includes a plurality of set top boxes (STB 1 108, . . . , STB N 118), a plurality of televisions (TV 1 110, . . . , TV N 120), a plurality of personal computers (PC 1 114, . . . , PC N 124), and a plurality of remote control devices (remote control device 1 112, . . . , remote control device N 122). Each set top box (STB 1, . . . , STB N 118) includes a digital video recorder (DVR 1 109, . . . , DVR N 119). Each of the personal computers (PC 1 114, . . . , PC 124) includes a display. STB 1 108 is coupled to cable modem 1 106 via link 144 and to TV 1 110 via link 148. Remote control device 1 112 is used to control STB 1 108, e.g., generating and transmitted exemplary wireless signal 150. PC 1 114 is also coupled to cable modem 1 106 via link 146. In some embodiments, a PC such as PC 1 114 is coupled to the Internet via a path which does not include a cable modem, e.g., via a cellular base station. STB N 118 is coupled to cable modem N 116 via link 158 and to TV N 120 via link 162. Remote control device N 122 is used to control STB N 118, e.g., generating and transmitted exemplary wireless signal 164. PC N 124 is also coupled to cable modem N 116 via link 160.

Exemplary system 100 further includes a plurality of base stations (base station 1 128, . . . , base station N 134), which are coupled to the social networking content server 126 via communications links (170, . . . , 172), respectively which include communications via the Internet 174. System 100 further includes a plurality of mobile node (mobile node 1 130, . . . , mobile node N 132) coupled to base station 1 128 via wireless links (152, . . . , 154) respectively. One of the mobile nodes (130, . . . , 132) may, and sometimes does, correspond to the same user as the user of remote control device 1 112 and/or the viewer of TV 1 110. System 100 further includes a plurality of mobile node (mobile node 1' 136, . . . , mobile node N' 138) coupled to base station N 134 via wireless links (166, . . . , 168) respectively. One of the mobile nodes (136, . . . , 138) may, and sometimes does, correspond to the same user as the user of remote control device N 122 and/or the viewer of TV N 120.

In some embodiments, social networking content corresponding to a video program is input via one or more of a PC, a mobile node, and a moderator node. In some embodiments, social networking content corresponding to a video program is displayed via one or more of a mobile node screen, a personal computer screen and a TV screen. In some embodiments, social networking content corresponding to a program is displayed on the same TV screen as the video content, e.g., with the combining of the video content and the social networking content being performed in the STB. In various embodiments, social networking content corresponding to a video program is moderated by a live moderator, e.g., interfacing via moderator node 127. In various embodiments, social networking content corresponding to a program is available in real time or near real time as part of an interactive user experience and is stored and available for subsequent retrieval, e.g., when viewing a stored program via a DVR.

In some embodiments, user control signaling related to social networking content in conjunction with video content is via a personal computer. In some embodiments, user control signaling related to social networking content in conjunction with video content is via a remote control device interfacing to a set top box.

Figure 2:
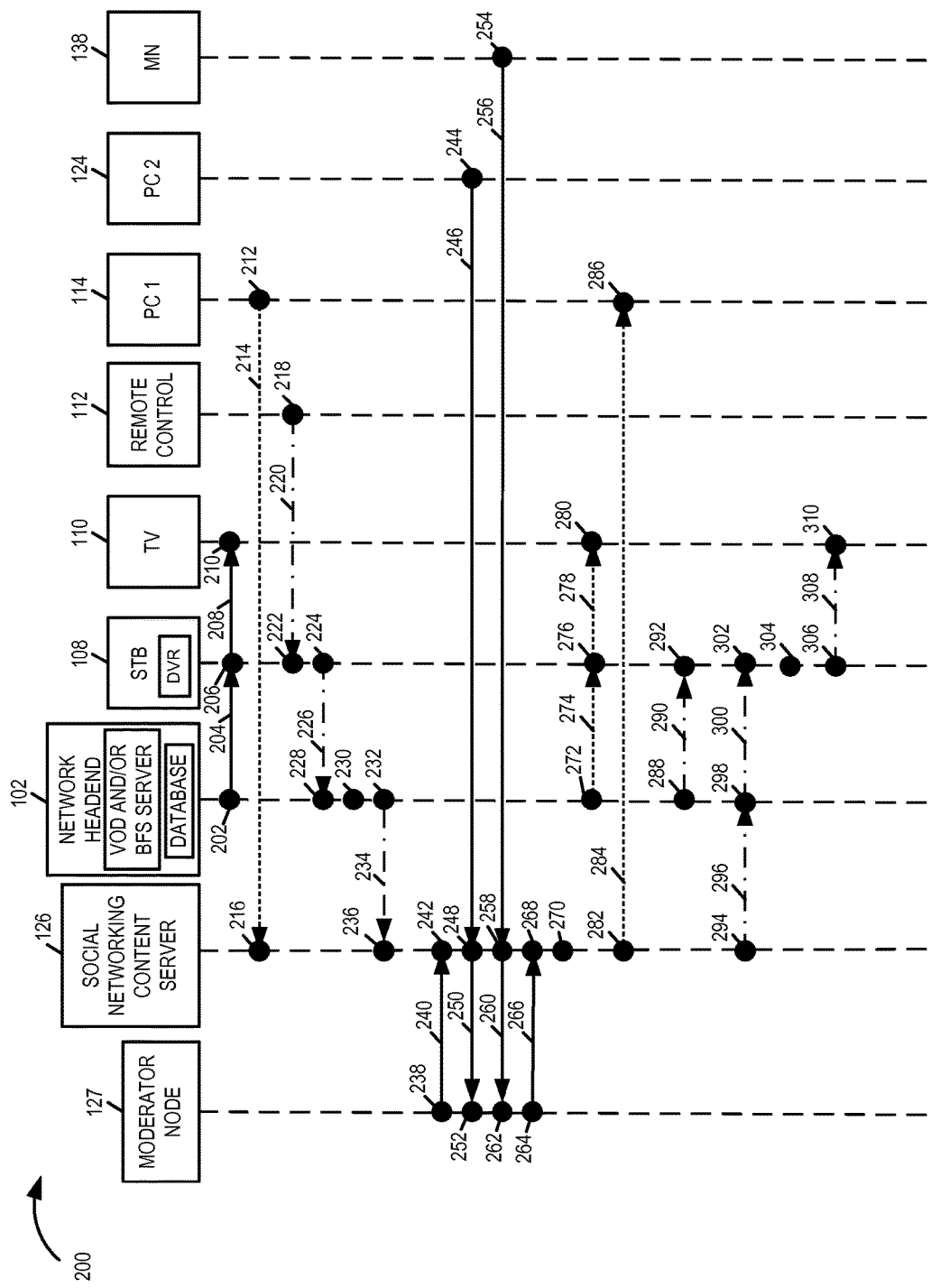
FIG. 2 illustrates an exemplary method in which social networking content is generated and displayed concurrently with video program content in accordance with various embodiments.

Drawing 200 of FIG. 2 illustrates an exemplary method of providing access to social networking content in accordance with various embodiments. Operation starts in step 202, where the network headend 102 generates and sends signals 204 to STB 108 communicating on demand or broadcast content. In step 206 STB 108 receives signals 204 and generates and transmits signals 208 to TV 110 communicating the received on demand or broadcast content.

In some embodiments, the social networking content server 126 is notified of a user's request to receive social networking content corresponding to a program via input from a PC. Steps 212-216 are used to describe this approach. In some other embodiments, the social networking content server 126 is notified of a user's request to receive social networking content corresponding to a program via signaling from a remote controller. Steps 218-236 are used to describe this approach.

In step 212 login information is entered into computer 114 indicating a program that is being viewed, the login information is received by the computer 114, and computer 114 generates signal 215 communicating the login information to the social networking content server 126. In step 216 the social networking content server 126 receives the login information indicating the program being viewed. In some embodiments, in which the PC sending the log-in information is coupled to a cable modem, the login information transverse the network headend. In some other embodiments, in which the PC sending the log-in information is not coupled to a cable modem, the login information is communicated to the social networking content server, e.g., via the Internet, and does not traverse the network headend.

In step 218 the remote control device 112 generates and sends a signal 220, e.g., an IR signal, to STB 108 indicating a request for social networking content. In step 222 STB 108 receives request signal 220. In step 222 STB 108 generates and sends signal 226 to network headend 102 communicating the request for social network content. In step 228 network headend 102 receives the request for social networking content from STB 108. In step 230, the network headend performs a device lookup in customer database 105 to identify a device to which a set of comments, e.g., a set of social networking content comments, is to be sent in response to the request from the set top box. In some embodiments, the device lookup in customer database 105, identifies a device corresponding to STB 108 and retrieves the address corresponding to the identified device for use in sending the set of social networking comments. In some such embodiments, the address is the address corresponding to a personal computer or portable communications device on which the comments may be displayed, e.g., the address of PC 1 114 or the address of a mobile node belonging to the user of remote control 112 and TV 110. In some embodiments, the device to which the set of comments are to be sent may be, and sometimes is, the set top box, e.g., STB 108. In step 232 the network headend 102, in response to the received request for social networking content, generates and sends signal 234 to social networking content server 126, communicating a message providing information indicating a device to which the set of comments is to be sent.

Steps 238-270 describe exemplary social networking content generation corresponding to an exemplary program, e.g., the program selected by the viewer of TV 110. In step 238 a live moderator inputs comments corresponding to the video program into the moderator node 127, and the moderator node 127 generates and transmits a signal 240 communicating the comments to social networking content server 126. In some embodiments, the live moderator is one of: a sports expert, a music expert, an entertainment expert, a technical expert, a political analyst, a historical expert, and a news reporter. Consider that the user of PC 2 124 and the user of MN 138 are both viewing the same video program that the user corresponding to TV 110 has selected to view and generating and receiving social networking content and are actively participating in interactive social networking while the program is being viewed. In step 242, the social networking content server receives signal 242 and stores the comments. In step 244 the user of PC 2 124 inputs comments corresponding to the video program into the PC 2 124, and PC 2 124 generates and transmits a signal 246 communicating the comments to social networking content server 126. In step 248 social networking content server 126 receives signal 246 and generates and transmits signal 250 communicating the received comment to moderator node 127. In step 252, moderator node 127 receives signal 250 and displays the comment to the moderator. In step 254 the user of MN 138, e.g., a cell phone with text messaging capability, inputs comments corresponding to the video program into the MN 138, and MN 138 generates and transmits a signal 256 communicating the comments to social networking content server 126. In step 258 social networking content server 126 receives signal 256 and generates and transmits signal 260 communicating the received comment to moderator node 127. In step 262, moderator node 127 receives signal 260 and displays the comment to the moderator. In step 260 the moderator, operating node 127, decides on which received comments are allowed to be displayed, edits received comments, and/or generates new comments. Then, moderator node 127 generates and transmits signal 266 communicating the result from the moderator, e.g., information related to a set of social networking content which is to be stored and distributed, the social networking content corresponding to a video program. For example, signal 266 communicates one or more or all of: information identifying received comments that are allowed to be included in the set of social networking content, information identifying received comments that are not to be included in the set of social networking content, information communicating edits to received comments, information identifying display ordering of comments, and new comments from the moderator.

In step 268 social networking content server 126 receives signal 266. In step 270 the social networking content server, generates a set of comments from social network messages and from input from a live moderator of the social network, e.g., from information received in signals 240, 246, 256, and 266. In some embodiments, the social network messages include at least one tweet message.

Steps 272-286 illustrate one exemplary approach of distributing social networking content in conjunction with video content in accordance with some embodiments. In this first example, the device identified to receive the set of social networking comments corresponding to the video program is PC 1 114. Steps 286-310 illustrate another exemplary approach of distributing social networking content in conjunction with video content in accordance with some embodiments. In this second example, the device identified to receive the set of social networking comments corresponding to the video program is STB 108.

In step 272 the network headend generates and transmits signal 274 communicating video program content to STB 108. In step 276 STB 108 receives signal 274 and generates and transmits signal 278 communicating the received video program content to TV 110. In step 280, TV 110 receives signal 278 and displays video content, obtained via STB 108, corresponding to a video program. In step 282, the social networking content server 126 generates and transmits signal 284 sending the set of comments related to the video program being viewed on TV 110, which was generated in step 270. In step 286, PC 1 114 receives signal 284 and displays the social networking content including a set of comments relating to the video program while the video program is being displayed on TV 110. The display of video content on the television screen of TV 110 in step 280 is occurring concurrently with the display of the corresponding set of social networking content on the computer screen of PC 1 114.

In step 288 the network headend 102 generates and transmits signal 290 communicating video program content to STB 108. In step 292, STB 108 receives signal 290 and recovers the communicated video program content. In step 294, social networking content server 126 generates and transmits signal 296. Signal 296 includes a set of social networking comments and is being sent to STB 108, e.g., it is addressed to STB 108. In step 298, network headend 102 receives signal 296 and generates and transmits signal 300, forwarding the received set of social networking comments to the intended recipient, STB 108. In step 302 STB 108 receives signal 300 and recovers the set of social networking comments being communicated. In step 304 STB 108 combines the received video program content from step 302 with the received corresponding set of social networking content from step 304, e.g., for display on a common display screen. Then, in step 306, the STB generates and transmits signal 308 including the combined information. In step 310, TV 110 receives the combined information from signal 308 and displays at least some of the set of social networking comments in a portion of a display screen on which the video content is being displayed.

In this example, the user corresponding to TV 110 may also send social networking content, e.g., text messages, to the social networking content server 126, which may be included, pending approval of the moderator, in the sets of social networking content being stored and distributed by the social networking content server 126. Thus the user of TV 110 may see comments that it has submitted fed back and displayed on its PC screen or TV screen while the video program is in progress and is being displayed on its TV screen.

In the example, of FIG. 2, the video content presented on TV 110 and corresponding social networking content corresponded to a live, e.g., ongoing video program. In various embodiments, a user can request and receive social networking content corresponding to a previously recorded program. In some such embodiments, a set of social networking comments displayed to a user along with video program content are comments which were previously stored, e.g., in the social networking content server and for which the content period has closed.

Figure 3:
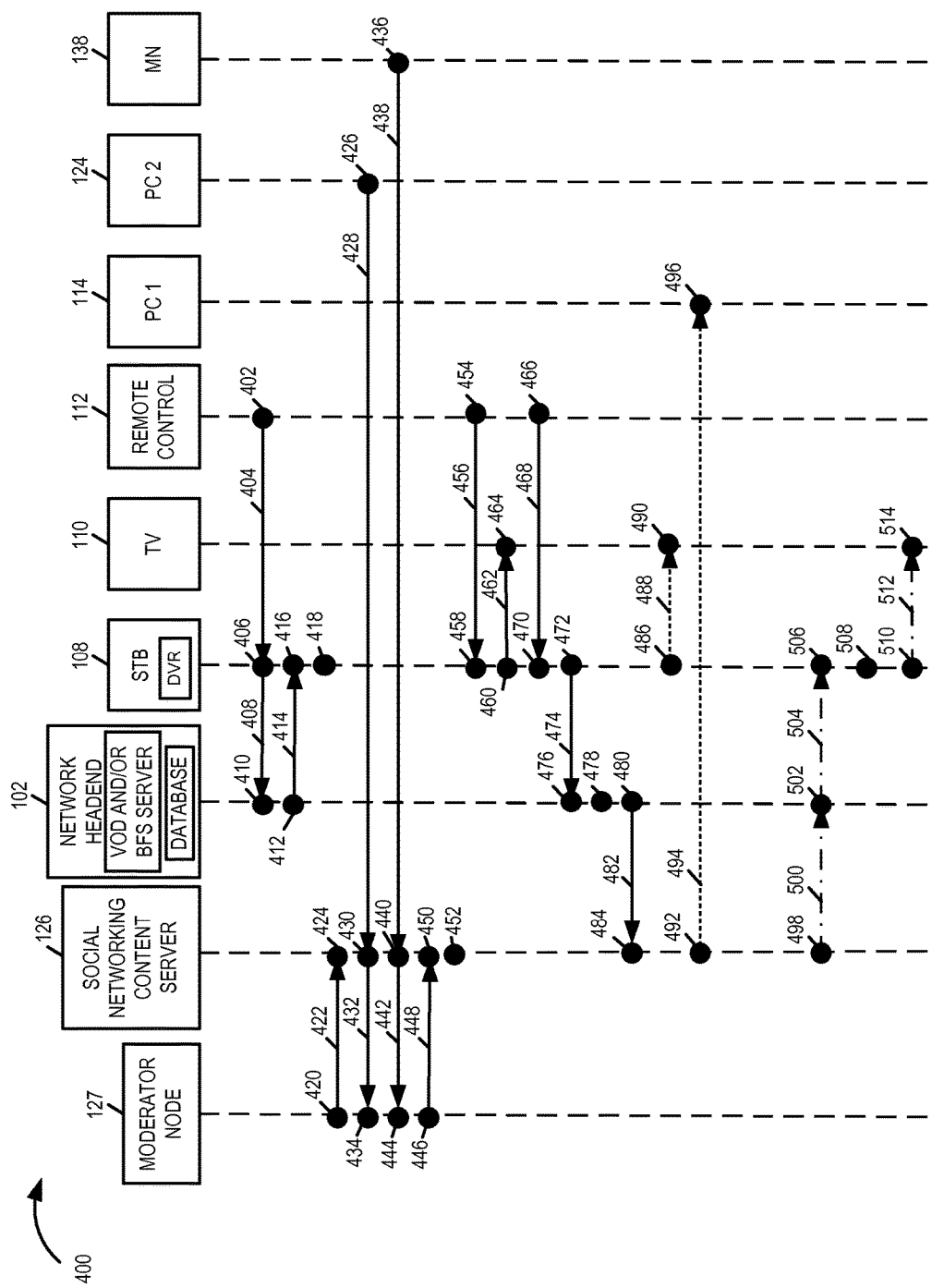
FIG. 3 illustrates an exemplary method in which stored social networking content corresponding to a video program is retrieved and displayed in conjunction with stored corresponding video program content in accordance with various embodiments.

Drawing 400 of FIG. 3 illustrates an example in which stored social networking content corresponding to a video program is retrieved and displayed in conjunction with the stored corresponding video program content. Drawing 400 of FIG. 3 illustrates an exemplary method of providing access to social networking content in accordance with various embodiments. Operation starts in step 402, where the user of remote control 102 decides to record a video program on DVR 109 included in STB 108, and the remote control 102 generates and sends signal 404 to STB 108 communicating the command to record a particular video program. In step 406, STB 406 receives the command to record the program, generates a signal 408 to request the video program and at the appropriate time, e.g., just prior to the start of the requested program, sends signal 408 to network headend 102. In step 410 network headend 102 receives video command request signal 408. In step 412, network headend 102 sends signals 414 to STB 108, where the signals are received in step 416. Included with the video content in signals 414 is information indicating whether or not social networking content is being stored concurrently with the video content, e.g., being stored concurrently in social networking content server 126. In step 418 STB 108 stores in its VCR the received video program content and the information indicating whether or not social networking content corresponding to the video program is also being stored.

In this example, while the program was in progress, social networking content was being concurrently generated, processed, stored and being made available to users. Exemplary steps 420-452 are related to social networking content generation and storage. Consider that the users of PC 2 124 and MN 138 were viewing the selected program being recorded on DVR 109 and were participating in a concurrent social networking commentary session being moderated by the moderator operating moderator node 127, who was also viewing the video program content being recorded on DVR 109.

In step 420 a live moderator inputs comments corresponding to the video program into the moderator node 127, and the moderator node 127 generates and transmits a signal 422 communicating the comments to social networking content server 126. In some embodiments, the live moderator is one of: a sports expert, a music expert, an entertainment expert, a technical expert, a political analyst, a historical expert, and a news reporter. In step 423, the social networking content server receives signal 422 and stores the comments. In step 426 the user of PC 2 124 inputs comments corresponding to the video program into the PC 2 124, and PC 2 124 generates and transmits a signal 428 communicating the comments to social networking content server 126. In step 430 social networking content server 126 receives signal 428 and generates and transmits signal 432 communicating the received comment to moderator node 127. In step 434, moderator node 127 receives signal 432 and displays the comment to the moderator. In step 436 the user of MN 138, e.g., a cell phone with text messaging capability, inputs comments corresponding to the video program into MN 138, and MN 138 generates and transmits a signal 438 communicating the comments to social networking content server 126. In step 440 social networking content server 126 receives signal 438 and generates and transmits signal 442 communicating the received comment to moderator node 127. In step 444, moderator node 127 receives signal 442 and displays the comment to the moderator. In step 446 the moderator, operating node 127, decides on which received comments are allowed to be displayed, edits received comments, and/or generates new comments. Then, moderator node 127 generates and transmits signal 448 communicating the result from the moderator, e.g., information related to a set of social networking content which is to be stored and distributed, the social networking content corresponding to a video program. For example, signal 448 communicates one or more or all of: information identifying received comments that are allowed to be included in the set of social networking content, information identifying received comments that are not to be included in the set of social networking content, information communicating edits to received comments, information identifying display ordering of comments, and new comments from the moderator. Although illustrates for a few messages, during the course of the video program many messages may be generated, communicated, subjected to moderator processing, e.g., screening and/or editing, and stored on the social networking content server 126. Step 452 represents the storage of a set of information corresponding to the program being recorded by DVR 109, e.g., a processed message log available for playback at a later time.

Consider that the recording of the video program on DVR 109 has completed and the corresponding social networking session has terminated with a corresponding set of social content information stored on social networking content server 126. At some later point in time, the operator of STB 108, decides that he would like to playback the program which has been recorded on DVR 109. In step 454, the operator selects the program to be played back and remote control device 112 generates and transmits signal 456 to STB 108 requesting that the program be played back. In step 458 STB 108 receives signal 456 and checks the stored information to see whether or not social networking content information has been stored corresponding to the request program and is available for playback in conjunction with the stored video program content. In this example, corresponding social networking content was stored and is available for playback. In step 460 STB 108 generates and transmits signal 460, communicating information indicating that corresponding social networking content is available, to TV 110. In step 462 TV 110 displays information indicating that the corresponding social networking content is available. In step 466, the user of STB 108 and viewer of TV 110 decides that he would like to view the recorded social networking content, and remote control 112 generates and transmits signal 468, indicating that stored social networking content is being requested to be retrieved, to STB 108. In step 470 STB 108 receives the social networking content request signal. In step 472 STB 108 generates and transmits signal 474 to network headend 102 requesting that social networking content is being requested corresponding to the selected recorded program that is being requested to be played back. In step 476 the network headend receives the request of signal 474.

In step 478, the network headend performs a device lookup in customer database 105 to identify a device to which a set of comments, e.g., a set of social networking content comments, is to be sent in response to the request from the set top box. In some embodiments, the device lookup in customer database 105, identifies a device corresponding to STB 108 and retrieves the address corresponding to the identified device for use in sending the set of social networking comments. In some such embodiments, the address is the address corresponding to a personal computer or portable communications device on which the comments may be displayed, e.g., the address of PC 1 114 or the address of a mobile node belonging to the user of remote control 112 and TV 110. In some embodiments, the device to which the set of comments are to be sent may be, and sometimes is, the set top box, e.g., STB 108. In step 480 the network headend 102, in response to the received request for social networking content, generates and sends signal 482 to social networking content server 126, communicating a message providing information indicating a device to which the set of comments is to be sent and the video program corresponding to the comments. In some embodiments, there is a plurality of different alternative set of comments, e.g., corresponding to different moderators, and the information identifying the particular request set of information is also included in signal 482.

In step 484 social networking content server 126 receives signal 482. In step 270 the social networking content server, retries the request stored set of comments from among a plurality of sets of stored sets of comments corresponding to different video programs and/or different moderators. The stored set of social networking comments is derived from social network messages and from input from a live moderator of the social network, e.g., from information received in signals 240, 246, 256, and 266. In some embodiments, the social network messages include at least one tweet message.

Steps 486-496 illustrate one exemplary approach of retrieving and displaying stored social networking content in conjunction with stored corresponding video content in accordance with some embodiments. In this first example, the device identified to receive the set of social networking comments corresponding to the video program is PC 1 114. Steps 498-519 illustrate another exemplary approach of retrieving and displaying stored social networking content in conjunction with stored corresponding video content in accordance with some embodiments. In this second example, the device identified to receive the set of social networking comments corresponding to the video program is STB 108.

In step 486 STB 108 controls DVR 109 to start playing back the request stored program and generates and transmits signals 488 communicating the stored video program content of step 418 to TV 110. In step 490, TV 110 receives signals 488 and displays video content, obtained via STB 108, corresponding to the requested stored video program. In step 492, the social networking content server 126 generates and transmits signal 494 sending the stored set of comments related to the video program being played back and viewed on TV 110. In step 496, PC 1 114 receives signal 494 and displays the stored social networking content including a set of comments relating to the video program while the previously recorded video program is being displayed on TV 110. The display of video content on the television screen of TV 110 in step 280 is occurring concurrently with the display of the corresponding set of social networking content on the computer screen of PC 1 114. In some embodiments, STB 108 controls synchronization between the display of video content on TV 110 and the display of social networking content on PC 1, e.g., sending timing synchronization signals to the social networking content server 126.

In step 498, social networking content server 126 generates and transmits signals 500. Signals 500 include the requested stored set of social networking comments and is being sent to STB 108, e.g., it is addressed to STB 108. In step 502, network headend 102 receives signal 500 and generates and transmits signals 504, forwarding the received set of social networking comments to the intended recipient, STB 108. In step 506 STB 108 receives signals 504 and recovers the set of social networking comments being communicated. In step 508 STB 108 combines the stored video program content from step 418 with the received corresponding stored set of social networking content from step 506, e.g., for display on a common display screen. Then, in step 508, the STB generates and transmits signal 512 including the combined information. In step 514, TV 110 receives the combined information from signal 308 and displays at least some of the set of social networking comments in a portion of a display screen on which the video content is being displayed.

Figure 4:
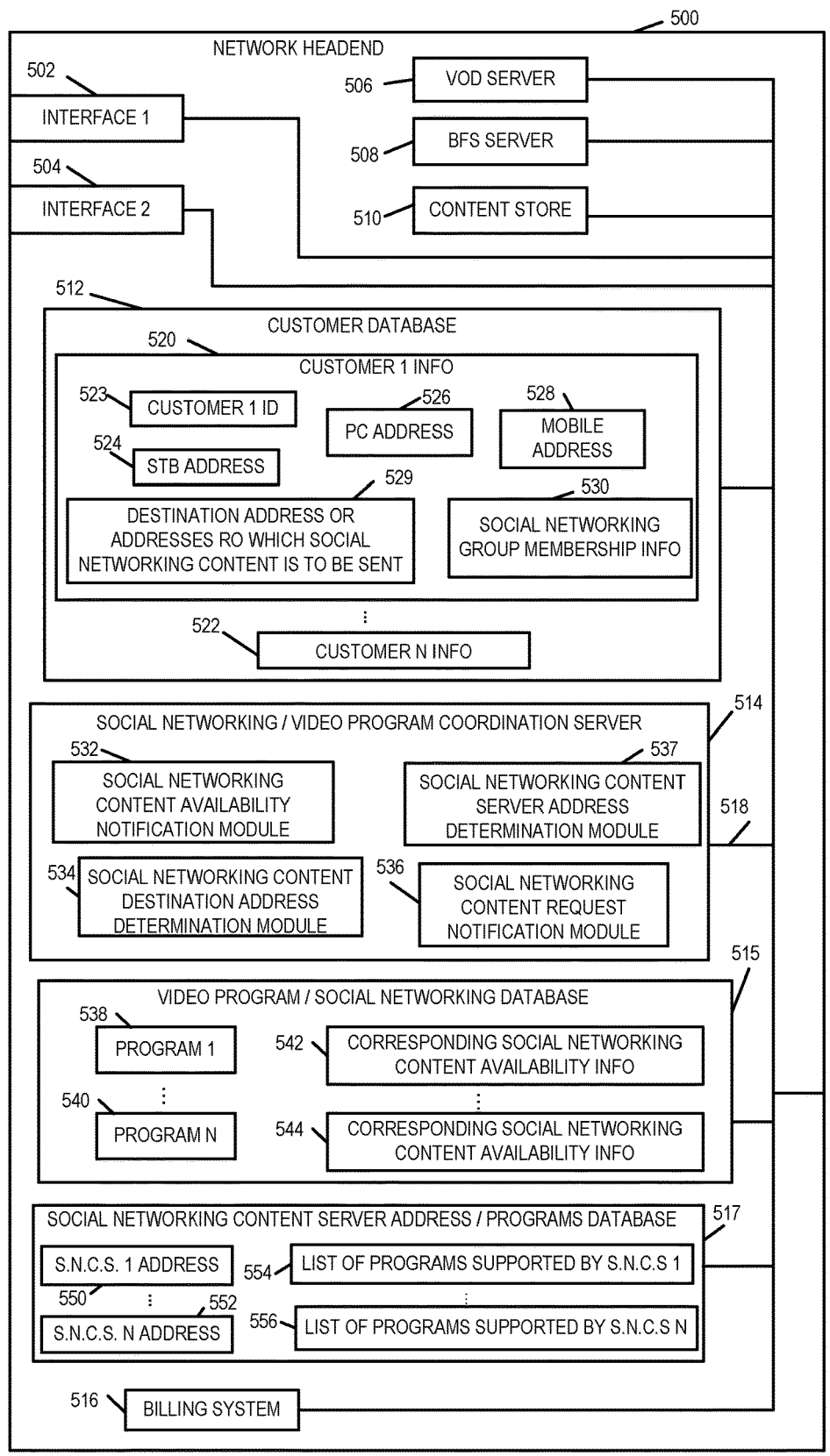
FIG. 4 is a drawing of an exemplary network headend in accordance with some embodiments.

FIG. 4 is a drawing of an exemplary network headend 500 in accordance with some embodiments. Exemplary network headend 500 is, e.g., network headend 102 of one or more of FIGS. 1, 2 and 3. Network headend 500 includes a first interface, interface 1 502, a second interface, interface 2 504, a VOD server 506, a BFS server 508, a content store 510, a customer database 512, a social networking/video program coordination server 514, a video program/social networking database 515, a social networking content server address/programs database 517, and a billing system 516 coupled together via bus 518 over which the various elements may interchange data and information. Interface 1 502 is used to couple the network headend to a plurality of cable modems, while interface 2 504 is used to couple the network headend to a social networking content server, e.g., via the Internet. The cable modems provide an interface to STBs and/or computers at customer premises.

Content store 510 includes video program content, e.g., sets of video programs, that are made available to customers, e.g., in accordance with a broadcast schedule and/or on demand. VOD server performs operations related to video on demand, e.g., operations related to retrieval and delivery of selected VOD programs. BFS server 508 performs operations related to broadcasting video programs in accordance with a schedule. Customer database 512 includes a plurality of sets of customer information (customer 1 information 520, . . . , customer N information 522). Customer 1 information 520 includes customer 1 ID information 523, a customer 1 STB address 524, a customer 1 PC address 526, a customer 1 mobile address 528, destination address or addresses to which social networking content is to be sent 529, and social networking group membership information 530. In some embodiments, information 529 includes one or more of STB address 524, PC address 526 and mobile address 528. In some embodiments, at different times information 529 identifies a different address as the destination for the social networking content. In some embodiments, the customer has configured a user profile to select the destination address for social networking content.

Video program/social networking database 515 includes information associating a plurality of video programs with corresponding social networking content availability information (information identifying program 1 538 and corresponding social networking content availability information 542, . . . , information identifying program N 540 and corresponding social networking content availability information 544). For example, consider that program 1 is a scheduled program in content store 510 which is to be broadcast by the BFS server, information 542 includes information indicating whether or not an interactive social networking content session is to be performed concurrently with the broadcast of program 1, information identifying the moderator, information identifying any group membership requirements for participation and/or access. In some embodiments, there may be, and sometimes are, a plurality of alternative social networking sessions corresponding to the same program, e.g., with different moderators and/or corresponding to different group membership information. Consider another example in which program N is a VOD program in content store 510, which was previously broadcast by the BFS server, information 544 includes information indicating whether or not an interactive social networking content session was performed concurrently with the broadcast of program N and is stored and available for retrieval, information identifying the moderator, information identifying any group membership requirements for access. In some embodiments, there may be, and sometimes are, a plurality of alternative social networking sessions corresponding to same program, e.g., with different moderator and/or corresponding to different group membership information.

Social networking/video program coordination server 514 includes a social networking content availability notification module 532, a social networking content address determination module 534, a social networking content request notification module 536, and a social networking content server address determination module 537. Social networking content availability notification module 532 determines whether or not social networking content corresponding to a video program is or will be available to be displayed with a selected video program. For example, module 532, in response to a received program request and/or a received request for social networking content from a customer, module 532 performs a look-up in video program/social networking database 515 and accesses social networking group membership information corresponding to the customer in customer database 512 to determine whether or not social networking content is or will be available to be presented with the video program content to the customer. In some embodiments, module 532 generates a signal to communicate to the customer the availability determination. In some embodiments, in response to a video program request, module 532 determines social networking content availability information and reports it to the customer.

Social networking content destination address determination module 534, determines the address to which the social networking content is to be sent corresponding to a particular user at a particular time, e.g., using information in the customer database, e.g., via a look-up retrieving address mapping information. Social networking content request notification module 536 generates signals directed to the social networking content server notifying the social networking content server which particular sets of social networking content including comments are to be directed to which particular devices. A social networking content request notification signal, in some embodiments, includes information identifying a set of social networking information and information identifying a device targeted to receive the information, e.g., an IP address identified by social networking content destination address determination module 534.

Social networking content server address/programs database 517 includes a plurality of sets of information relating different social networking content severs to corresponding video programs ((social networking contend server 1 address 550 and a corresponding list 554 of programs supported by social networking content server 1), . . . (social networking contend server N address 552 and a corresponding list 556 of programs supported by social networking content server N)). The social network content server address determination module 537 determines the address of the social network information server to which a request for social networking content is to be sent based on a content identifier received from a set top box indentifying the video content to be displayed, e.g., the program, and the information included in database 517 associating different programs with different content information servers.

Billing system 516 performs billing operations related to the video distribution system and social networking content distribution system. In some embodiments, access to participate in some social networking sessions and/or view some social networking session involves billing charges. In some embodiments, access to participate in some social networking sessions and/or view some social networking session involves subscription to a group membership including a charge and billing. In some embodiments, some social networking sessions which occur concurrently with video program delivery use a celebrity moderator and additional charges is billed to the customer.

Figure 5:
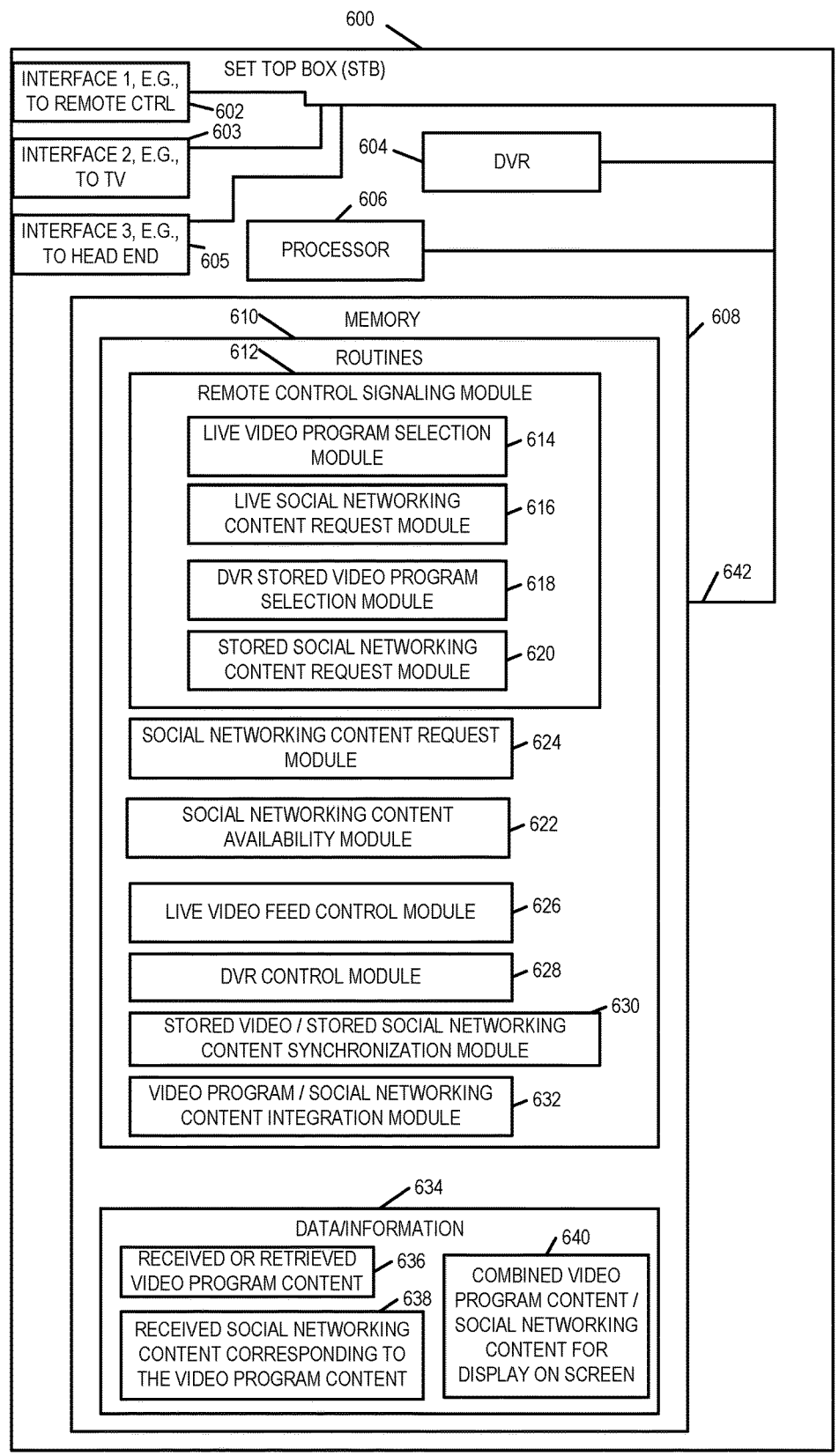
FIG. 5 is a drawing of an exemplary set top box in accordance with various embodiments.

FIG. 5 is a drawing of an exemplary set top box (STB) 600 in accordance with various embodiments. Exemplary set top box 600 is, e.g., set top box 108 of one or more of FIGS. 1, 2 and 3. Exemplary set to top 600 includes a plurality of interfaces (interface 1 602, interface 2 603, interface 3 605, a DVR 604, a processor 606, and memory 608 coupled together via bus 642 over which the various elements may interchange data and information.

Interface 1 602, e.g., an infra-red interface, is used to interface with a remote control device which allows a user to control at least some functions of the set top box 600. Exemplary information received via interface 1 602 includes: a request for a particular scheduled video broadcast program, a request that social networking content be communicated in conjunction with the video program, information indicating the desired destination device of the social networking content, information indicating a selected moderator for the social networking content, information indicating a selected group for the social networking content, information indicating that social networking content should be communicated in conjunction with video content whenever available, information indicating that social networking content should never be communicated with video content, information indicating that the display of social networking content in progress should be turned-off, information indicating that social networking content display should be turned-on, information identifying one or more selected programs for which social networking content is to be displayed, a command to play back video program content stored on DVR 604, a response to a inquiry as to whether or not stored social networking content is to be displayed in conjunction with the video program content which is to be played back, and information authorizing a charge for access to social networking content.

Interface 2 603 is used to couple the set top box to a TV, and interface 3 605 is used to couple the set top box 600 to a network headend. Memory 608 includes routines 610 and data/information 634. The processor 606, e.g., a CPU, executes the routines 612 and uses the data/information 634 in memory 608 to operate the set top box and implement steps of a method, e.g., steps described with regard to a method of FIG. 2 and/or of FIG. 3 with regard to set top box operations.

Routines 610 includes a remote control signaling module 612, a social networking content request module 624, a social networking content availability module 622, a live video feed control module 626, a DVR control module 628, a stored video/stored social networking content synchronization module 630, and a video program/social networking content integration module 632. Data information 634 includes received or retrieved video program content 636, received social networking content corresponding to the video program content 638, and combined video program content/social networking content for display on a screen, e.g., the TV screen of the TV coupled to STB 600. Video program/social networking content integration module 632 uses information 636 and 638 as inputs and generates information 640 as an output. In some embodiments, the video program content and social networking content, e.g., a set of moderated and/or edited text messages, are displayed on different area of a split screen. In some embodiments, the social networking content is presented as an overlay on top of the video program content. In some embodiments, the user can select between different alternative presentation formats for the combined information presentation, e.g., including split screen formats, overlay formats, and different sizes, fonts, and/or colors for the social networking content including text messages. In some embodiments, the alternative presentation selection is via the remote control device.

Remote control signaling module 612 processes received remote control signals received via interface 1 602 and responds to the information being communicated in the received signal. Various exemplary response operations include updating received configuration information, responding to a request for video content, and responding to a request for social networking content corresponding to video content. Remote control signaling module 612 includes a live video program selection module 614, a live social networking content request module 616, a DVR stored video program selection module 618 and a stored social networking content request module 620. Live video program selection module 614 processes a received signal from the remote control device indicating a request for a scheduled broadcast program. Live social networking content request module 616 processes a received signal from the remote control device indicating a request for social networking content, e.g., corresponding to the selected program indicated in the signal received by module 614. DVR stored program selection module 618 processes a received signal from the remote control indicating that a program stored on the DVR 604 is being requested to be played back. Stored social networking content request module 620 processes a received signal from the remote control indicating that the operator of the remote control is requesting stored social networking content to be communicated in conjunction with the play back video that is being requested. In some embodiments, a received social networking request, may, and sometimes does, includes information identifying the device, e.g., an address corresponding to the device, to which the social networking content that is being requested is to be direct to, e.g., the STB for display on the TV screen, a PC, or a mobile device.

Social networking content request module 624 generates a request for social networking content corresponding to a video program which is directed to the social networking content server via the network headend, e.g., in response to a signal detected by module 616. In some embodiments, the request message generated by module 624 includes destination address information to which the social networking content should be sent. In some other embodiments, the destination address information is added by the headend, e.g., after performing a look-up corresponding to the customer records.

Social networking content availability module 622 determines whether or not social networking content will be or is available corresponding to a video program. Social networking content availability module 622 generates signals to display information indicating the result of its determination on the TV coupled to STB 600. Social networking content availability module 622, in some embodiments, also accesses information stored on DVR 604 in conjunction with a stored recorded program to determine whether or not social networking content has been stored and is available on a social networking content server. For example, when the program is recorded on DVR 604 information indicating social networking content availability, in some embodiments, is also stored on DVR 604. In some embodiments, the stored information indicating availability is a single bit status flag corresponding to the availability/non availability of a stored social networking content session log including a set of text messages.

Live feed video control module 628 controls operations related to the streaming of video being communicated from a broadcast file server and being directed to a TV coupled to the STB 600, e.g., responding to a broadcast program selection. DVR control module 628 controls operation related to the playback of video program content stored on DVR 604, e.g., retrieving video program content from DVT 604 in response to a playback command corresponding to a selected stored video content program. In some embodiments, an availability check with regard to stored social networking content and/or user prompts as to whether or not stored social networking content is desired to be displayed are initiated in response to an identified user request for a stored video program to be played back.

Stored video/stored social networking content synchronization module 630 performs synchronization operations to coordinate that the stored video program content being retrieved from the DVR 604 is displayed in appropriate synchronization with the corresponding set of stored social networking content. In some embodiments, both the retrieved video program content and the corresponding retrieved social networking content are combined and displayed on a TV, and synchronization operations are performed internal to STB 600. In some other embodiments, the retrieved video program content and the retrieved corresponding social networking content are displayed on different devices, e.g., with the video program content being displayed on a TV couple to the STB 600 and the corresponding social networking content being displayed on a mobile wireless device, and synchronization signals are generated and sent to at least one of: the social networking content server from which the stored social networking content is being sourced and the end device which is receiving the social networking content. In this way, synchronization can be maintained between the video content and social networking content when the viewer issues command to the DVR such as stop, fast forward, rewind.

Figure 6:
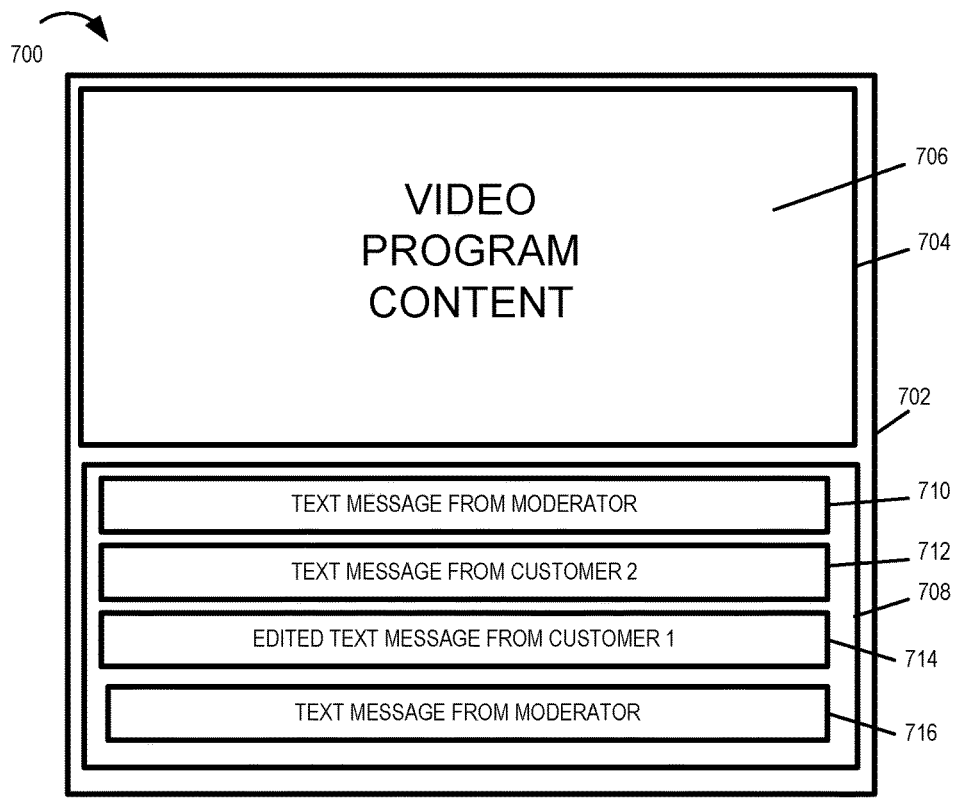
FIG. 6 illustrates the display of video content, corresponding to a video program, and social networking content including a set of comments relating to the video program on the same screen in accordance with a first exemplary format.

Drawing 700 of FIG. 6 illustrates one example of displayed video content corresponding to a video program and displayed social networking content including a set of comments relating to the video program while the video program is being displayed in accordance with one exemplary format. In this example, the video program content and the corresponding social networking content is displayed on the same screen and has been combined in a set top box. Screen 702 is a television screen of customer 1 which is coupled to the set top box, which combined the video program content and the social networking content. In this format, the video program content 706 is displayed in a first portion of the screen 704, dedicated to video program content, and the social networking content is displayed in a second portion of the screen 708, which is dedicated to displaying corresponding social networking content. The two portions of the screen (704, 708) are non-overlapping. The social networking content includes a set of text messages (text message 710 from a moderator, text message 712 from customer 2, text message 714, which is an edited version of a text message which was submitted from customer 1 and edited by the moderator, and text message 716 from the moderator).

Figure 7:
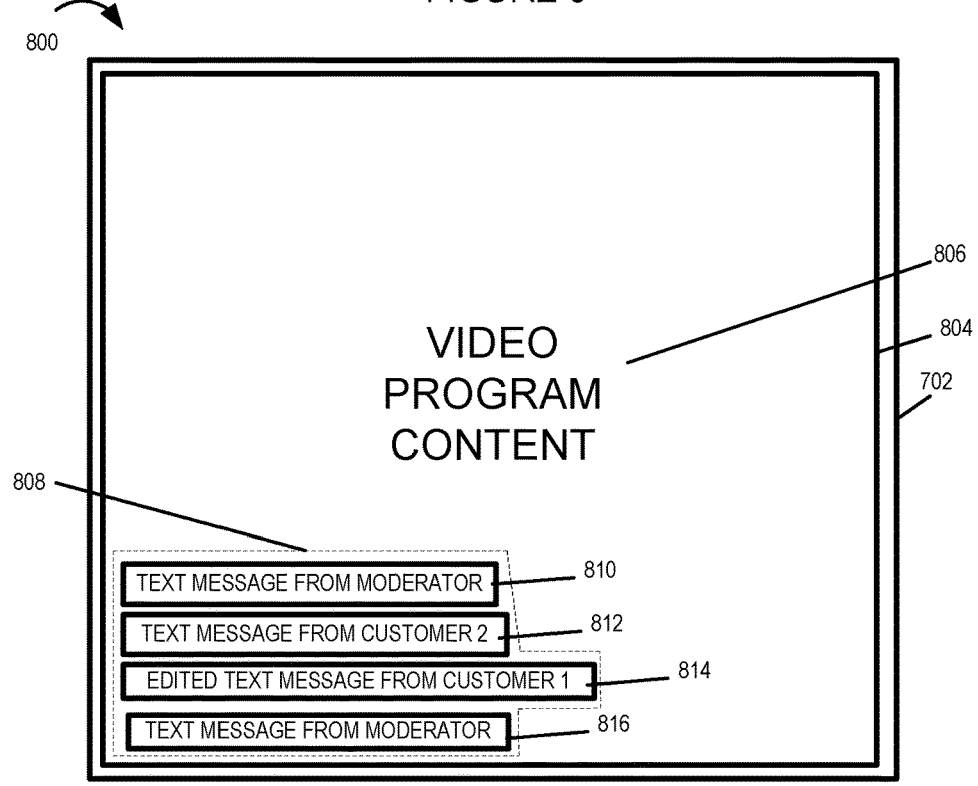
FIG. 7 illustrates the display of video content, corresponding to a video program, and social networking content including a set of comments relating to the video program on the same screen in accordance with a second exemplary format.

Drawing 800 of FIG. 7 illustrates an example of displayed video content corresponding to a video program and displayed social network content including a set of comments relating to the video program while the video program is being displayed in accordance with another exemplary format. In this example, the video program content and the corresponding social networking content are displayed on the same screen and have been combined in a set top box. Screen 702 is a television screen of customer 1 which is coupled to the set top box which combined the video program content and the social networking content. In this format, the video program content 806 is displayed in area 804 which is substantially the full screen. The corresponding social networking content is displayed in portion 808 as an overlay, which obstructs view of a portion of the video program content. The size of the area obstructed changes in response to the amount of area used to display messages. In some embodiments, the amount of overlay is restricted to no more than 20% of the full screen area. In some embodiments, the user can select, e.g., via a remote control signal to the STB, the maximum amount of area to be used to display social networking content. The exemplary social networking content includes a set of text messages (text message 810 from a moderator, text message 812 from customer 2, text message 814, which is an edited version of a text message which was submitted from customer 1 and edited by the moderator, and text message 716 from the moderator).

In various embodiments system elements described herein are implemented using one or more modules to perform the steps corresponding to one or more methods of the present invention, for example, communication detection, communication disposition, signal processing, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a non-transitory machine readable medium such as a non-transitory memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

The methods and apparatus of the present invention, are applicable to and can be used with a one or a combination of systems including cable systems, telephone systems, cellular systems, etc. Numerous additional variations of the methods and apparatus of the present invention described above will be apparent to those skilled in the art in view of the above description of the invention. Such variations are to be considered within the scope of the invention.

What is claimed is:

1. A method of providing access to social networking content, comprising:
    receiving, at a network headend coupled to a plurality of customer premises, a request for social networking content corresponding to a video program, said request being from a first customer premise device located at a first customer premise;
    performing, in response to said request for social networking content from the first customer premise device, a lookup at said network headend to identify from information stored at said network headend, a device which is different from said first customer premise device, to which a set of comments relating to said video program is to be sent in response to said request for social networking content;
    identifying, at said network headend, based on a content identifier corresponding to said video program, one of a plurality of social networking content servers to which said network headend is to send a message, said message indicating the identified device to which said set of comments relating to said video program is to be sent;
    communicating to the identified social networking content server, said message indicating the identified device to which said set of comments relating to said video program is to be sent;
    obtaining video content corresponding to the video program via the first customer premise device;
    displaying said obtained video content, corresponding to the video program on a television screen to a user; and
    sending social networking content including the set of comments relating to said video program to said identified device to support display of said set of comments on said identified device while said video program is being displayed.

2. The method of claim 1, wherein the set of comments relating to said video program includes a text message from a moderator of a social network.

3. The method of claim 1, further comprising:
    generating said set of comments from social network messages and input from a live moderator of a social network.

4. The method of claim 3,
    wherein said live moderator is one of a sports expert, music expert, entertainment expert, and news reporter; and
    wherein the method further comprises:
    operating a moderator node which is separate from the identified social networking content server to send a signal communicating said input from the live moderator to said identified social networking content server, said input including:
    i) information identifying received comments that are allowed to be included in the set of social networking content, ii) information identifying received comments that are not to be included in the set of social networking content, iii) information communicating edits to received comments, iv) information identifying display ordering of comments, and v) new comments from the moderator.

5. The method of claim 1, wherein said first customer premise device is a set top box, the method further comprising:
    receiving at a social networking content server, login information from a computer, said login information indicating said video program as a program being viewed by said user; and
    sending from said social networking content server, following said social networking content server receiving said login information, said set of comments relating to said video program being viewed.

6. The method of claim 5, wherein said login information further includes a user identifier identifying said user.

7. The method of claim 1,
    wherein sending social networking content including the set of comments relating to said video program to said identified device includes operating the identified social networking content server to communicate said set of comments to said identified device via a communications network.

8. The method of claim 1, wherein said first customer premise device is a set top box.

9. A method of providing access to social networking content, comprising:
    displaying video content, obtained via a set top box, corresponding to a video program on a television screen to a user;
    displaying social networking content including a set of comments relating to said video program to said user on a computer screen of a computer, said displaying social networking content being performed while said video program is being displayed;
    prior to displaying social networking content, receiving at said set top box a signal from a remote control indicating a request for social networking content;
    receiving at a network headend, a request for social networking content from said set top box; and
    in response to said request for social networking content, sending a message from the network headend to a social networking content server, said message providing information indicating a device to which said set of comments is to be sent, said device to which said set of comments is to be sent being said computer.

10. The method of claim 9, wherein said set top box includes a digital video recorder and said video content is content corresponding to a previously recorded program.

11. The method of claim 10, wherein said set of comments are comments which were previously stored and for which the comment period has closed.

12. The method of claim 9, further comprising:
performing a device lookup in a customer database to identify said computer to which social networking content is to be sent in response to said request from said set top box, said computer corresponding to said set top box; and
wherein said customer database is included in the network headend which also includes an on-demand video server for supplying video content on demand, a broadcast file server for broadcasting video content, said network headend being separate from the social networking content server.

13. The method of claim 12,
wherein said message providing information indicating a device to which said set of comments is to be sent further includes information indicating a video program to which the set of comments correspond; and
wherein said device lookup identifies said computer corresponding to said set top box and retrieves an address corresponding to said computer for use in sending said set of comments.

14. A system which provides access to social networking content, comprising:
a network headend coupled to a plurality of customer premises, said network headend being configured to:
receive, a request for social networking content corresponding to a video program, from a first customer premise device located at a first customer premise; and
perform, in response to said request for social networking content from the first customer premise device, a lookup at said network headend to identify from information stored at said network headend, a device which is different from said first customer premise device, to which a set of comments relating to said video program is to be sent in response to said request for social networking content;
identify, at said network headend, based on a content identifier corresponding to said video program, one of a plurality of social networking content servers to which said network headend is to send a message, said message indicating the identified device to which said set of comments relating to said video program is to be sent; and
communicate to the identified social networking content server, said message indicating the identified device to which said set of comments relating to said video program is to be sent;
the first customer premise device, said first customer premise device being configured to obtain video content corresponding to said video program and display said obtained video content on a television screen to a customer; and
a social networking content server configured to send social networking content including the set of comments relating to said video program to said identified device to support display of said set of comments on a display screen of said identified device while said video program is being displayed on said television screen, said identified device being one of a personal computer or a portable communications device.

15. The system of claim 14, wherein said identified device is in the same room as said television screen to which said video content is supplied by said first customer premise device for display.

16. The system of claim 14, wherein said social networking content server is further configured to generate said set of comments from social network messages and input from a live moderator of a social networking to which said social network server corresponds.

17. The system of claim 16, wherein said social networking content server is further configured to receive said request for social networking content corresponding to the video program via said network headend.

18. The system of claim 14, wherein said first customer premise device is a set top box.

19. The system of claim 18, wherein said network headend stores information indicating addresses of one or more social networking content servers associated with one or more programs, said network headend being further configured to determine the address of the identified social networking content server to which said message is to be sent.

20. The system of claim 14, wherein said lookup is performed by said network headend from information stored in a customer database included in said network headend.

* * * * *